United States Patent
Yeh et al.

(10) Patent No.: US 7,487,120 B1
(45) Date of Patent: Feb. 3, 2009

(54) METHODS AND SYSTEM FOR CONTINUOUS REPLENISHMENT PLANNING OF CONSIGNMENT INVENTORY

(75) Inventors: Chia-Shun Yeh, Taichung (TW); Chung-Chieh Ko, HsinChu (TW); Tsan-Tu Ko, Hsin Chu (TW); Chung-Ming Tai, Jubei (TW); Yi-Sung Lin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1048 days.

(21) Appl. No.: 10/268,213

(22) Filed: Oct. 10, 2002

(51) Int. Cl.
*G06G 1/00* (2006.01)
(52) U.S. Cl. .................. 705/28; 705/7; 705/10
(58) Field of Classification Search ............ 705/28, 705/7, 10
See application file for complete search history.

(56) References Cited

U.S. PATENT DOCUMENTS

| | | | | |
|---|---|---|---|---|
| 5,884,300 | A | | 3/1999 | Brockman ............ 707/2 |
| 5,953,707 | A | * | 9/1999 | Huang et al. .......... 705/10 |
| 5,963,919 | A | | 10/1999 | Brinkley et al. ........ 705/28 |
| 6,256,773 | B1 | * | 7/2001 | Bowman-Amuah ...... 717/121 |
| 6,996,538 | B2 | * | 2/2006 | Lucas ................ 705/28 |
| 7,100,826 | B1 | * | 9/2006 | Phan et al. ............ 235/385 |
| 2001/0004520 | A1 | | 6/2001 | Nomoto et al. |
| 2001/0004734 | A1 | | 6/2001 | Kudoh et al. |
| 2002/0069096 | A1 | * | 6/2002 | Lindoerfer et al. ...... 705/7 |
| 2002/0138316 | A1 | * | 9/2002 | Katz et al. ............ 705/7 |
| 2003/0110104 | A1 | * | 6/2003 | King et al. ........... 705/28 |

FOREIGN PATENT DOCUMENTS

DE 4304748 * 8/1994

OTHER PUBLICATIONS

Cashin, Jerry, "Wireless links loom on horizon", Software Magazine, v13n6 pp. 99-101+, Apr. 1993.*

* cited by examiner

*Primary Examiner*—Michael Cuff
(74) *Attorney, Agent, or Firm*—Haynes and Boone, LLP (57) ABSTRACT

A new method and system is provided for the interfacing with, replenishing and otherwise managing of a consignment inventory. Input data that address the content of the consignment inventory are supplied. Business flow is controlled be setting a periodical target of material released from the consignment inventory, by setting periodically sock limitations of high, low and an adequate supply of materials in the consignment inventory, and by providing an intelligent dispatching mechanism for releasing materials from the consignment inventory. In interface with the vendor keeps the vendor informed of the level of materials on hand. The method and system of the invention is supported and implemented using computed controlled data base storage.

19 Claims, 5 Drawing Sheets

METHODS AND SYSTEM FOR CONTINUOUS REPLENISHMENT PLANNING OF CONSIGNMENT INVENTORY

BACKGROUND OF THE INVENTION (1) Field of the Invention

The invention relates to the fabrication of integrated circuit devices, and more particularly, to a method and system for the continuous replenishment of a consignment inventory.

(2) Description of the Prior Art

In the creation of semiconductor devices, numerous factors which affect this creation must be considered that relate not only to the creation of high-end, high-performance devices but, fundamentally and basic to all considerations of a semiconductor process, to the cost that is incurred by either direct manufacturing aspects or by supporting aspects of creating semiconductor devices.

Specifically referred to in this instance are costs incurred by pre-production inventory, that is by storing, maintaining and making available to the production process materials stored in consignment that are required in a timely fashion by the manufacturing process. In view of the well known complexity of a semiconductor manufacturing process, further in view of the high-throughput that is typically required in order to meet production cost objectives, further in view of the delicate and perishable nature of many of the materials that are used for the creation of semiconductor devices, the problem of pre-storage for such production can be considered to be both daunting and of great significance as a cost-contributor to creating semiconductor devices.

It is therefore desirable to be supported by a dependable, efficient and most importantly cost-effective method of storing and managing semiconductor materials before these materials are required for processing purposes. Considerations apply to this such as considerations of cost, material availability, being able to handle just-in-time requirements, no deterioration of the stored materials over time, safety and a host of others.

A number of semiconductor foundries, in support of semiconductor manufacturing processes and for purposes of improved cost control, depend on inventory storage and management on a consignment nature, whereby suppliers of required semiconductor materials consign inventory to storage facilities of the foundry. Typically, the cost of such storage arrangements is carried by the consignee as opposed to the semiconductor foundry. As one of the conditions for such an arrangement however the foundry is typically required to draw a minimum amount of the stocked materials, for reasons of cost sharing and to an extent for reasons of minimizing the cost carried by the consignee and for assurance that materials are in fact available at the time that these materials are needed.

This latter arrangement requires an interface, in the form of material dispatchers, between the semiconductor foundry and the consignment inventory. For this reason a method is required by the semiconductor foundry that allows cost effective handling of materials that are stored on a consignment basis such that both parties to this arrangement, the consignee and the semiconductor foundry, can meet their respective objectives and responsibilities in an optimum manner. The invention addresses this concern and provides a method and a system that assures, on a cost-effective basis, an acceptable approach of planning, replenishment planning and interfacing with a consignment inventory.

U.S. Pat. No. 5,884,300 to Brockman discloses an inventory management model and system. Consignment inventory is addressed.

U.S. Pat. No. 5,963,919 to Brinkley et al. describes a system and method for evaluating of multiple inventory management strategies. Accessing means, analyzing means and selection means are provided for determining optimum strategies.

SUMMARY OF THE INVENTION

A principle objective of the invention is to optimize the flow of semiconductor materials between a consignment inventory and a semiconductor foundry.

Another objective of the invention is to reduce cost and to shorten the process cycle time of interfacing between a consignment inventory and a semiconductor foundry.

Yet another objective of the invention is to assure adequate planning for a continuous replenishing of materials stored in a consignment inventory to a semiconductor foundry.

A still further objective of the invention is to provide a system of planning in support of material dispatchers, with the objective of interfacing with a common consignment inventory of multiple vendors.

A still further objective of the invention is to provide a system of planning in support of material dispatchers with the objective of dispatching the consignment inventory of multiple vendors to a common consignment inventory.

In accordance with the objectives of the invention a new method and system is provided for the interfacing with, replenishing and otherwise managing of a consignment inventory. Input data that address the content of the consignment inventory are supplied. Business flow is controlled be setting a monthly target of product released from the consignment inventory, by setting monthly sock limitations of high, low and an adequate supply of materials in the consignment inventory, and by providing an intelligent dispatching mechanism for releasing materials from the consignment inventory. In interface with the vendor keeps the vendor informed of the level of materials on hand. The method and system of the invention is supported and implemented using computed controlled data base storage.

DESCRIPTION OF THE PREFERRED EMBODIMENTS

Cost control of a manufacturing facility requires that the cost of storing required materials be kept to a minimum. For this reason, it is frequently desirable to store needed materials on consignment, requests are submitted against these stored materials by dispatchers of the semiconductor foundry (the ultimate user of the materials) to supply certain materials in certain quantities to the foundry. The invention addresses issues that arise in the interface between the dispatcher and a consignment inventory in addition to assisting vendors that stock a consignment inventory in improved management of this stocking operation.

In order to meet the previously stated objectives, the invention provides a system that comprises three main components of functions in accordance with the functional division of input-processing-output, as follow:

1. A data input function, which provides required data to the method and system of the invention
2. An application server, also referred to as a business process flow function, which address functions of process flow and suggests the quantity of materials, by vendor, of a vendor's inventory that should or can be dispatched to the foundry, and
3. A database server, also referred to as a data storage function, which maintains the data required by the method and system of the invention on a database.

Of these functions, the data input function is applied for each material requisition and comprises the following information:

1. Plant of origin, material movement and cost center, and
2. Material identification and issued quantity.

Of these functions, the application server functions, which have as objective to determine the quantity of the vendor consignment inventory that must be dispatched to the foundry, are subdivided into functions addressing:

1. Establish a target, for each vendor, for a monthly quantity of material that must be stored in consignment storage; this function is executed monthly as a batch processing job
2. Establish, for each vendor, high, low and adequate (or safe) limits, of a monthly quantity of material that must be stored in consignment storage; this function is executed monthly as a batch processing job
3. Provide for intelligent dispatching of the stored materials, which provides for dynamic dispatching of materials for each material requisition that is issued by the engineering community, using functions of:
   Calculate vendor priority
   Determine candidate vendors
   Calculate dispatching quantity, and
   Handle inventory shortage.
4. Inform the vendor of the level or quantity of stocked materials; this function is executed periodically, possibly daily, as a batch processing job.

Of these functions, the database server functions are subdivided into functions addressing:
   Vendor material and material requisition
   The target quantity of vendor material that must be on hand
   The issued quantity of material, which is the actually issued amount of material by vendor per month, and
   Inventory data that reflect the status of the vendor consignment material.

The data that is provided to the above indicated data input function comprises:
   source plant ID, that is the plant from which the materials that are assigned to the consignment inventory originate
   The ID of the material that is requisitioned
   The quantity of the material that is requisitioned, and
   Data in support of a cost-center function.

The data that, by manual (keyboard) input and operator interaction, is provided to the data input function, is supplied to the application servers for the execution of the indicated application functions. For this purpose, the application servers retrieve the data that have been listed above as being supplied to the data input function for calculation of the amount of material that must be released or dispatched for a particular requisition by the engineers of the semiconductor foundry. The database and the therewith-related records are, after the requisition has been approved and released, updated by the application servers.

With the above highlighted functional capabilities, the system of the invention provides for continuous replenishment planning of the consignment inventory, which serves as a valuable tool in the management of a semiconductor foundry. Furthermore, the system of the invention allows material dispatchers to dispatch, on a per vendor basis, as the need (requisition) for such materials arises. By further correctly selecting monthly high, low and adequate stocking targets, the system can assign or otherwise be instrumental in determining the quantity of materials that can be dispatched for a given material requisition. From the data that is controlled and managed by the system, detailed reports can readily be created for use by either the foundry management of to assist the company that supplies the material for consignment storage, of how to best provide materials to the consignment inventory.

In view of the fact that two of the sub-components of the system of the invention merely address data inputting and data storage while the essence of the invention is centered on the functions of the application servers, these application servers will next be further detailed. In order to facilitate this further explanation, a glossary of terms is first presented.

Issued quantity: the quantity of materials that are issued or released from consignment storage as a result of a requisition that is submitted by an engineer to a dispatcher, the latter processing the requisition Vendor material data: data that relates materials that are stored in consignment storage with the vendor who supplies these materials Vendor target quantity data: data that indicates the expected or desired or targeted amount of material that is released, per month, from the consignment inventory, classified by vendor Vendor issued quantity data: data that indicates the actual amount of material that is released, per month, from the consignment inventory, classified by vendor Target rate: a target percentage or rate of material that is assigned to consignment storage by a particular vendor, as a percentage of the total targeted-issued amount of material stored in consignment storage, also referred to as a monthly target quantity by material for each consignment vendor Consumption rate: the actual percentage or rate of material of a particular vendor that is issued or released from consignment storage as a result of one or more requisitions, as a percentage of the total actual-issued amount of material stored in consignment Achieved rate: the consumption rate minus the target rate, and Seven-day demand quantity: the total of the target quantities per week, which is the sum of the target quantities of all vendors multiplied by (7/30).

Figure 1:
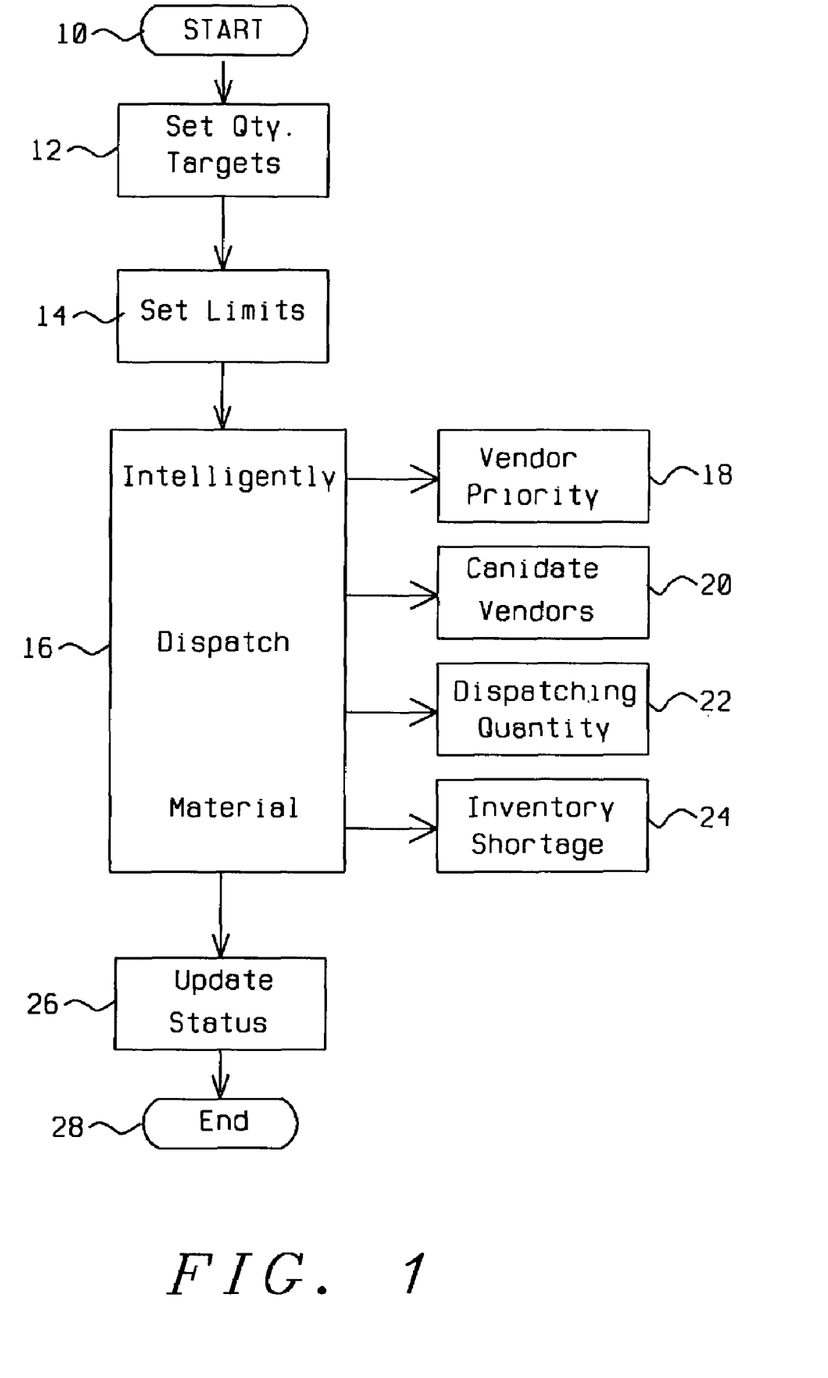
FIG. 1 shows a summary flowchart of the method and system of the invention.

A flow diagram of the processing of the invention is now highlighted using the flow-diagram of FIG. 1:
   10, the start or invocation (linking to) the software support package of the invention
   12, the setting of monthly target quantity by material for each consignment vendor 14 the setting of high, low and safe limits stored in the consignment storage by material and by vendor 16, the function of dispatching material for each material requisition that is submitted by engineer(s) to the dispatcher, this function is divided into four separate functions, that is:

18, calculate the vendor priority 20, determine candidate vendors 22, calculate dispatching quantity, and 24, handle inventory shortage 26, automatically update vendor stock status on a periodic basis, potentially daily or monthly 28, end the execution of the support software of the invention.

Figure 2:
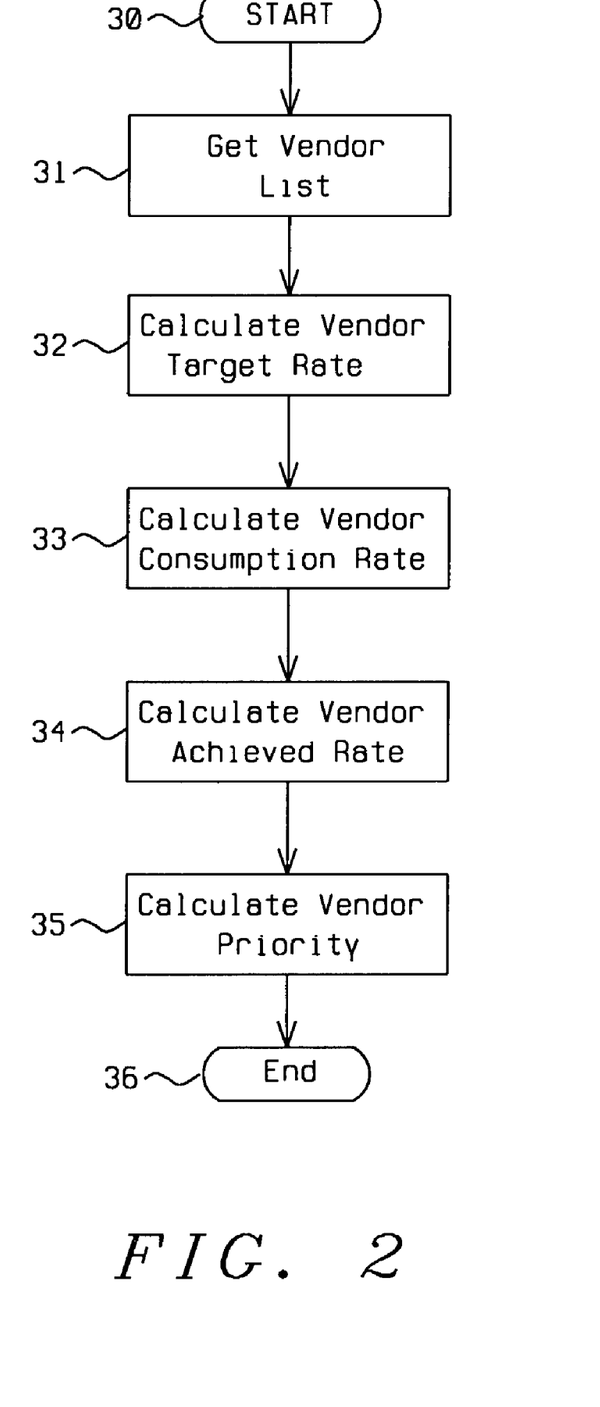
FIG. 2 shows a flow chart of a first major function of the method and system of the invention, that is the calculation of vendor priority that is used in dispatching materials from the consignment inventory.
Figure 3:
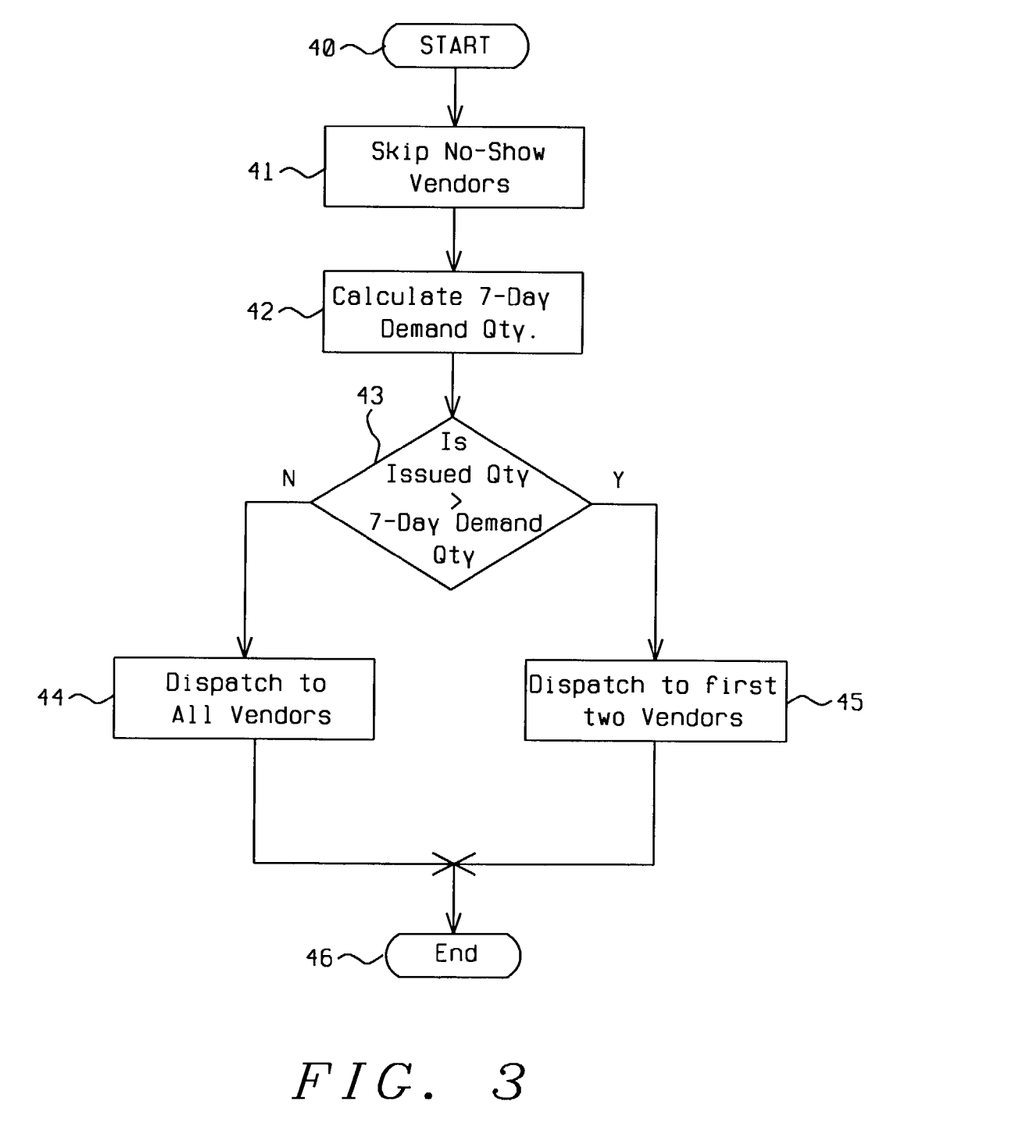
FIG. 3 shows a flow chart of a second major function of the method and system of the invention, that is the determination of candidate vendors for the dispatching materials from the consignment inventory.
Figure 4:
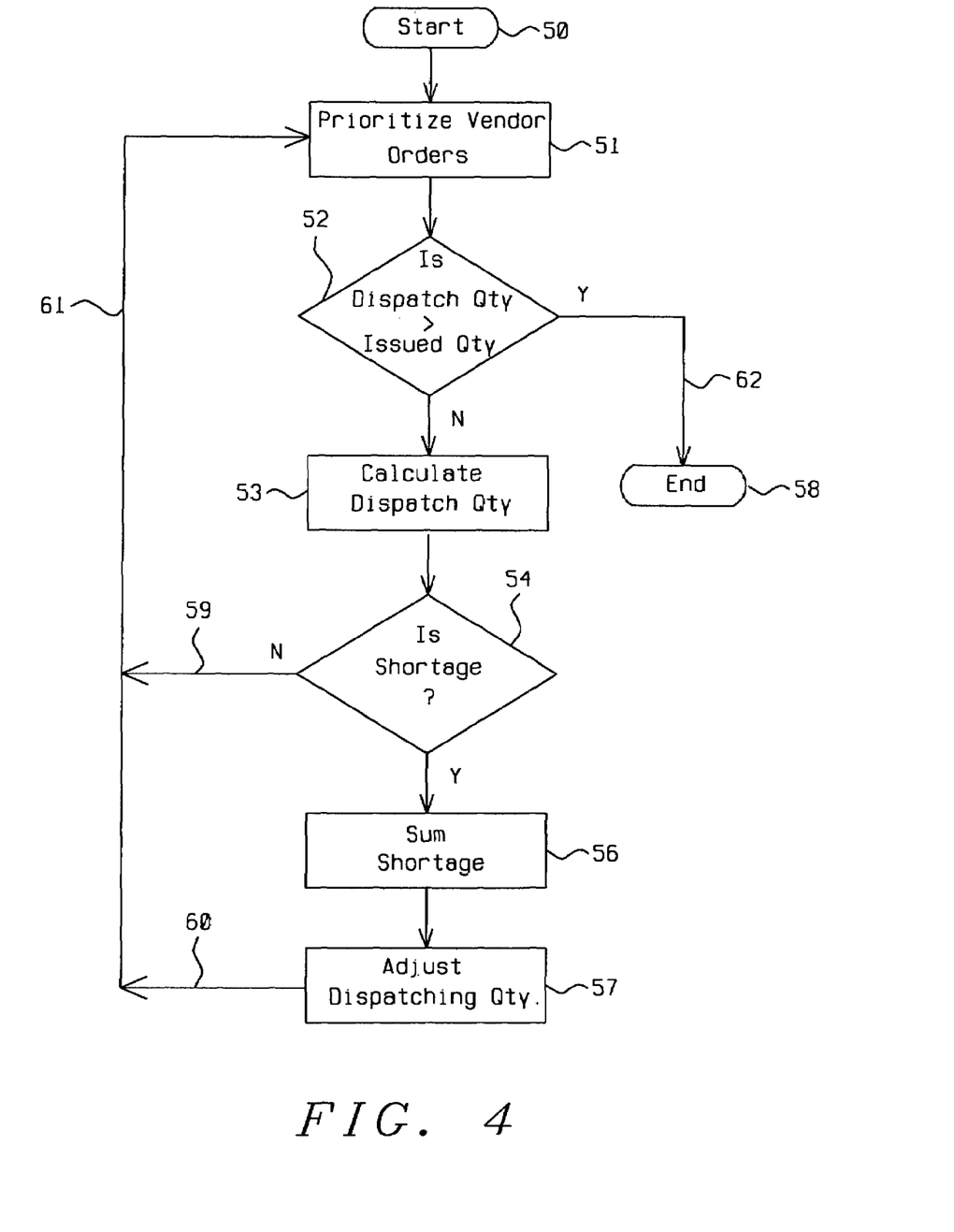
FIG. 4 shows a flow chart of a third major function of the method and system of the invention, that is the calculation of the quantity of dispatched materials and the handling of inventory shortage.

The functions that have been highlighted under items 18 through 24 above are now further detailed, using FIGS. 2 through 4.

FIG. 2 reflects function 18 above, that is the calculation of vendor priority, as follows:

30, starting the calculation of the vendor priority software routine by issuing a branch-to instruction from the main routine that has been highlighted in the flow diagram of FIG. 1

31, access the vendor list by means of data that is submitted via keyboard operator entry 32, calculate, by vendor, the target rate for a predetermined time period whereby the target rate equals the vendor target quantity (as defined above) divided by the summation of all vendors target quantities 33, calculate, by vendor, the consumption rate for a predetermined time period whereby the consumption rate equals the vendor issued quantity from consignment storage divided by the summation of all vendors issued quantities from consignment storage 34, calculate, by vendor, the achieved rate for a predetermined time period whereby the achieved rate equals the consumption rate minus the target rate 35, calculate the vendor priority and sort this vendor priority in ascending order, and 36, end the calculate vendor priority sub-routine by a branch instruction to the main routine under which this function is being executed.

The flow diagram that is shown in FIG. 3 shows further detail regarding the function of determining candidate vendors, as follows:

40, start the sub-function of determining candidate vendors by issuing a branch-to instruction from the main routine that has been highlighted in the flow diagram of FIG. 1

41, skip the vendors who have no stock stored in consignment storage 42, calculate the quantity of material required for a seven day period, this quantity is equal to the sum of all vendor target quantities multiplied by the factor (7/30)

43, determine if the issued quantity of material is larger than the calculated seven-day quantity, if yes 44, dispatch the requisitioned quantity to all vendors on the vendor priority list if no:

45, dispatch the requisitioned quantity to the first two vendors on the vendor priority list, and 46, terminate the determine candidate vendor software routine by issuing a branch-to instruction to the main routine that has been highlighted in the flow diagram of FIG. 1.

The flow chart of FIG. 4 shows details relating to the previously highlighted functions of calculating the dispatching quantity and handling inventory shortage are provided. Shown in the flow diagram of FIG. 4 are:

50, start the software routine by issuing a branch-to instruction from the main routine that has been highlighted in the flow diagram of FIG. 1

51, start a repeat of the software routine by order of priority within vendor 52, determine if the total dispatch quantity is larger than or equal to the issued quantity, whereby the relationship of the dispatch quantity and the issued quantity is defined below; if yes:

62, terminate the routine if no:

53, calculate the dispatch quantity of the vendor, whereby the dispatch quantity equals [the issued quantity] times [the vendor target quantity divided by the sum of the candidate vendor quantities]+[the sum of the shortage quantity of the prior vendors]

54, determine if the dispatch quantity is larger than the stock quantity, indicating a shortage of stocked material, if no:

59/61, branch back to the beginning of the routine if yes:

56, sum the shortage of the prior vendors 57, adjust the dispatching quantity to lot-based, and 60/61, branch back to the beginning of the routine.

Further detail relating to the data fields that are used by the invention are next provided:

For material requisition:
Key field: material requisition number, material ID, plant ID Non-key field: requisition quantity For Continuous Replenishment Planning (CRP) target quantity set-up active version:
Key field: plant ID, material ID, year, month, version For CRP target quantity and high, low and safe stock level set-up:
Key field: year, month, version, plant ID material ID, vendor ID
Non-key field: target quantity, highest stock, lowest stock, hold indicator For goods issued quantity accumulation:
Key field: year, month, cost center, material ID, plant ID, movement type, special sock indicator, vendor ID
Non-key field: issued quantity For consignment stock:
Key field: material ID, plant ID, special stock indicator, vendor ID
Non-key field: stock quantity For CRP calculated issued quantity:
Key field: material requisition number, material ID, vendor ID Non-key field: allocated quantity.

Figure 5:
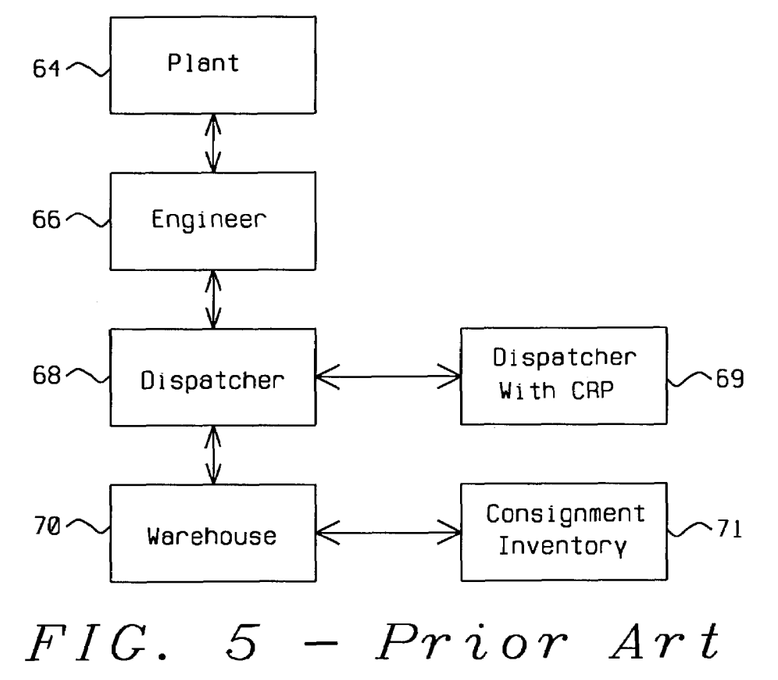
FIG. 5 shows a flow diagram of conventional product flow and inventory control.

To facilitate comparison of the invention with conventional methods of product flow and inventory control, the flow diagram of FIG. 5 has been provided. Shown in this flow diagram are the following functional blocks and related activities:

64, the plant of origin of the product that is controlled for storage in a foundry warehouse or that is assigned to a consignment inventory 66, an engineering function that applies material requisition to the material dispatcher for production 68, the dispatcher function that dispatches raw material to engineers for production, and 70, the warehouse where material stock is stored.

The goods issued for production flow and inventory control that is highlighted with the flow chart of FIG. 5 typically results in:

High inventory cost of the warehouse storing while the objective at the same time is to achieve low cost of the consignment inventory storage the goods issued for production flow that is shown in the flow chart of FIG. 5 is based on contacts with multiple vendors whereby the foundry issues a determined quantity of inventory, from this it is clear that the need exists for a decision support system for the material dispatcher, the invention as described in detail above provides such a decision support system for the material dispatcher.

Figure 6:
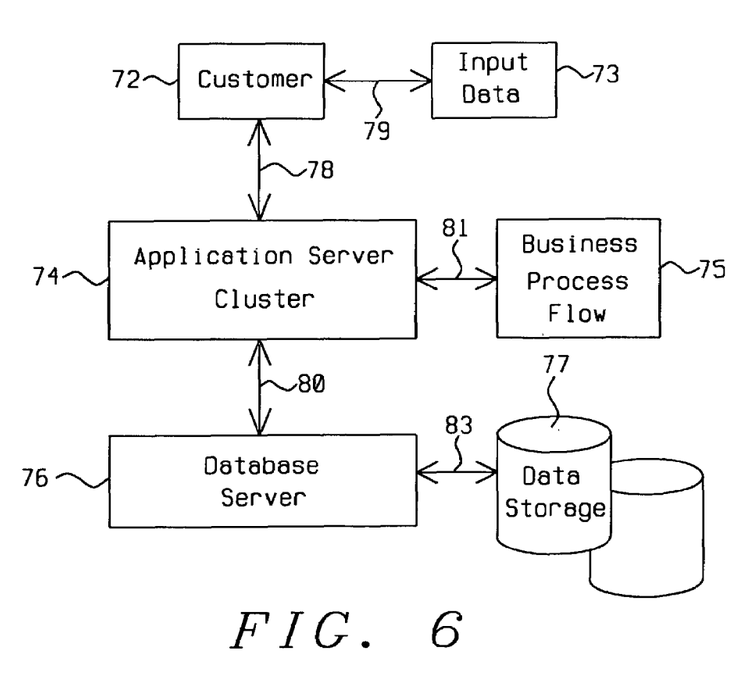
FIG. 6 shows a System Overview of the system of the invention.

Referring now to the flow diagram of FIG. 6, there is shown System Overview of the system implementation of the invention. Specifically highlighted in the flow diagram of FIG. 6 are the following functions and functional capabilities:

72, 79: the customer or user 72 of the system who provides, via interface 79, the 73: input data comprising:

1. plant, movement type and cost center data, and 2. material number and quantity issued 74, 78: the customer 72 interfaces, via two-way interface 78, with the Application Server Cluster 74

74, 75, 81: the Application Server Cluster 74 interfaces, via two-way interface 81, with the Business Process Flow 75 module, which 1. sets monthly target quantity 2. sets monthly high, low and safe stock levels 3. provides for intelligent dispatching by:

(i) calculating vendor priority (ii) determining candidate vendors (iii) calculating dispatching qualities, and (iv) handling inventory shortage, and 4. informs the vendor of stock level 74, 76, 80: Application Server Cluster 74 further interfaces, via two-way interface 80, with the Data Base Server 76, and which Interfaces via two-way interface 83 with the Data Storage functions 77, which maintain tables relating to 1. Vendor Material and Material Requisition 2. Vendor Target quantity 3. Vendor issued quantity data, and 4. Vendor consignment Inventory data.

The invention provides for:

1. Reducing inventory costs

2. Reducing foundry operational cost

3. Allowing for a multiple vendor consignment inventory

4. Reducing the procurement cycle

5. Providing for an inventory that can be collaboratively managed by vendor and foundry management.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method for continuous replenishment planning of a consignment inventory, comprising:

providing a consignment storage including material from each vendor of a plurality of vendors;

setting, for a pre-determined time period, a target quantity of material for each vendor of the plurality of vendors wherein the target quantity of material includes a first quantity of material to be stored in the consignment storage;

determining at least one of a high quantity value, a low quantity value, and a safe limit quantity value for each vendor of the plurality of vendors, wherein the high quantity value, the low quantity value and the safe limit quantity value each include a value associated with a quantity of material stored in the consignment storage;

selecting material to be dispatched from the consignment storage, from each vendor of the plurality of vendors, wherein the selecting material includes calculating vendor priority, and wherein the calculating vendor priority includes:

calculating, for each vendor of the plurality of vendors, a target rate wherein the target rate equals a vendor target quantity divided by a summation of all vendor target quantities;

calculating, for each vendor of the plurality of vendors, a consumption rate wherein the consumption rate equals a vendor issued quantity from consignment-storage divided by a summation of all vendor issued quantities from consignment storage;

calculating, for each vendor of the plurality of vendors, an achieved rate whereby the achieved rate equals the consumption rate minus the target rate; and dispatching the selected material; and automatically updating a vendor stock status record periodically, wherein the vendor stock status record provides an indication of a current quantity of material stored in the consignment storage by each vendor of the plurality of vendors.

2. The method of claim 1, said dispatching material further comprises:

determining candidate vendors;

calculating dispatching quantity; and handling inventory shortage.

3. The method of claim 2, said calculating dispatching quantity and handling inventory shortage comprising:

calculating a dispatch quantity of a vendor;

determining if a total dispatch quantity is larger than or equal to an issued quantity, (i) if yes, terminate calculating dispatching quantity and handling inventory shortage, and (ii) if no, calculating a dispatch quantity for a first vendor of the plurality of vendors including summing a shortage of prior vendors of the plurality of vendors;

adjusting a dispatch quantity to lot-based; and repeating said calculating dispatching quantity and handling inventory shortage for each vendor of the plurality of vendors by order of vendor priority.

4. The method of claim 3, whereby the dispatch quantity equals (an issued quantity) times (a vendor target quantity divided by a sum of target quantities of the plurality of vendors)+(a sum of a shortage quantity of prior vendors).

5. The method of claim 1, said target quantity of material for each vendor comprises data indicating an expected quantity of material being released, per predetermined time period, from the consignment storage, for each vendor.

6. The method of claim 1, said target quantity being supported by input data of plant ID, material ID, year, month and version.

7. The method of claim 1, said setting of high, low and safe limit quantity values being supported by data of year, month, version, plant ID, material ID, vendor ID, from which is calculated target quantity, highest stock, lowest stock, hold indicator.

8. The method of claim 1, said consignment inventory being providing with material based on input data of material ID, plant ID, special stock indicator, vendor ID from which is calculated stock quantity.

9. A method for continuous replenishment planning of a consignment inventory, comprising:
providing a consignment storage including material from each vendor of a plurality of vendors;
setting, for a pre-determined time period, a target quantity of material for each vendor of the plurality of vendors wherein the target quantity of material includes a first quantity of material to be stored in the consignment storage;
determining at least one of a high quantity value, a low quantity value, and a safe limit quantity value for each vendor of the plurality of vendors, wherein the high quantity value, the low quantity value and the safe limit quantity value each include a value associated with a quantity of material that may be stored in the consignment storage;
selecting material to be dispatched from the consignment storage, from each vendor of the plurality of vendors, wherein the selecting material includes calculating vendor priority, determining candidate vendors, calculating dispatching quantity, and handling inventory shortage, wherein said calculation of vendor priority includes:
accessing a vendor list of the plurality of vendors;
calculating, for each vendor of the plurality of vendors, a target rate for a predetermined time period whereby the target rate equals a vendor target quantity divided by a summation of all vendor target quantities;
calculating, for each vendor of the plurality of vendors, a consumption rate for a predetermined time period whereby the consumption rate equals a vendor issued quantity from consignment-storage divided by a summation of all vendor issued quantities from consignment storage;
calculating, for each vendor of the plurality of vendors, an achieved rate for a predetermined time period whereby the achieved rate equals the consumption rate minus the target rate; and
generating a vendor priority list using the calculated achieved rate; and
dispatching the selected material; and
automatically updating a vendor stock status record periodically, wherein the vendor stock status record provides an indication of a current quantity of material stored in the consignment storage by each vendor of the plurality of vendors.

10. The method of claim 9, said determining candidate vendors, comprising:
skipping vendors who have no stock stored in consignment storage;
calculating quantity of material required for a seven-day period, wherein this quantity is equal to a sum of all vendor target quantities multiplied by a numeric factor; and
determining if the issued quantity of material is larger than the calculated seven-day quantity, and
(i) if yes, dispatching a requisitioned quantity to all vendors on a vendor priority list, and
(ii) if no, dispatching a requisitioned quantity to first two vendors on the vendor priority list.

11. The method of claim 10, said quantity of material required for a seven-day period comprising a total of target quantities per week, being sum of target quantities of all vendors multiplied by a numeric factor.

12. The method of claim 10, said material requisition being supported by input data of material requisition number, material ID, plant ID from which is calculated material requisition quantity.

13. The method of claim 9, said issued quantity comprising a quantity of materials being issued or released from consignment storage as a result of a material requisition.

14. The method of claim 9, said vendor issued quantity comprising data indicating an actual amount of material being released, per predetermined time period, from the consignment storage, classified by vendor.

15. The method of claim 9, said target rate comprising a target percentage of material being assigned to consignment storage by a vendor, as a percentage of a total targeted-issued amount of material stored in consignment storage.

16. The method of claim 9, said consumption rate comprising an actual percentage of material of a vendor of the plurality of vendors being issued or released from consignment storage as a result of one or more requisitions, as a percentage of a total actual-issued amount of material in consignment storage.

17. The method of claim 9, said achieved rate comprising a consumption rate minus a target rate.

18. The method of claim 9, whereby said vendor issued quantity is supported by data of year, month, cost center, material ID, plant ID, movement type, special stock indicator, vendor ID from which is calculated issued quantity.

19. The method of claim 9, said assessing a vendor list comprising submitting data via keyboard operator entry.

* * * * *